Figure 1:
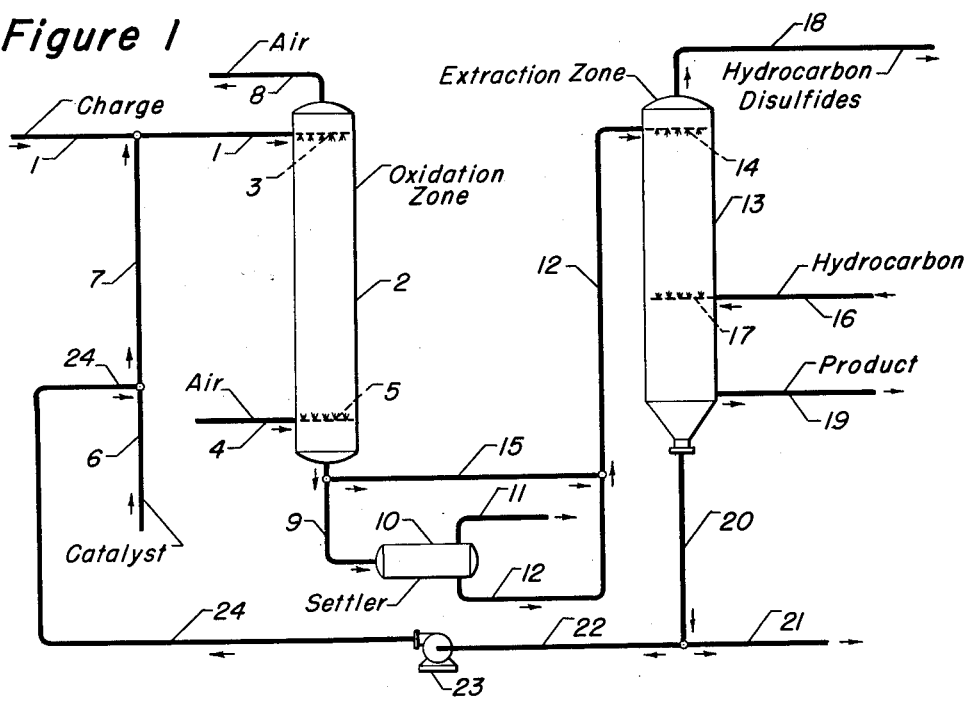
Figure 2:
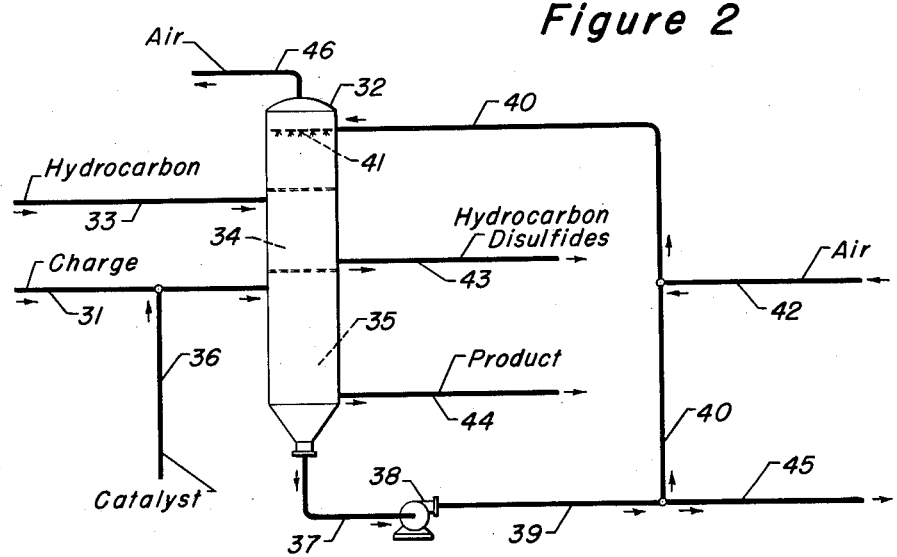

March 21, 1961   K. M. BROWN ET AL   2,976,229
PURIFICATION OF ACID OILS
Filed April 24, 1959

INVENTORS:
Kenneth M. Brown
William K. T. Gleim
BY: Chester J. Giuliani
Bernard L. Kramer
ATTORNEYS

# United States Patent Office 2,976,229
Patented Mar. 21, 1961

2,976,229

PURIFICATION OF ACID OILS

Kenneth M. Brown, Hinsdale, and William K. T. Gleim, Island Lake, Ill., assignors to Universal Oil Products Company, Des Plaines, Ill., a corporation of Delaware Filed Apr. 24, 1959, Ser. No. 808,721

10 Claims. (Cl. 208—2)

This invention relates to the purification of acid oils and more particularly to a novel method of removing mercaptans contained in alkaline solutions of acid oils.

Acid oils comprise primarily phenolic compounds of various species, including phenols, cresols, thiophenols, etc., and also contain carboxylic acids including both aliphatic and naphthenic. The acid oils are used for many purposes as, for example, phenolic acid oils are used, after further separation, in the manufacture of phenolformaldehyde resins. The acid oils also are used as intermediates in the manufacture of various chemical compounds. The acid oils also find use as disinfectants. Accordingly, it is desirable to recover the acid oils free from impurities.

Acid oils are recovered from petroleum sources by treating with an alkaline solution to form the corresponding salts or other compounds of the acid oils and alkaline compounds. The petroleum also contains mercaptans and the acid oils are recovered in the alkaline solution in admixture with mercaptans. The mercaptans are objectionable for the further use of the acid oils and must be removed. While petroleum provides one source of acid oils, acid oils also are obtained during the coking of coal, etc. Regardless of the source of the acid oils, when the acid oils are contaminated with mercaptans, the present invention provides an improved method for removing the mercaptans from the acid oils.

In one embodiment, the present invention relates to a process for removing mercaptans from an alkaline solution of acid oils containing mercaptans, which comprises oxidizing said mercaptans to disulfides in the presence of a phthalocyanine catalyst, and thereafter extracting the resultant disulfides from said solution by contacting the same with a hydrocarbon fraction and preferentially dissolving said disulfides in said hydrocarbon fraction.

As above described, the alkaline solution of acid oils is reacted with an oxidizing agent in the presence of a phthalocyanine catalyst to convert mercaptans to disulfides. Any suitable oxidizing agent may be used in the process and preferably comprises air. Oxygen or other oxygen-containing gases may be employed when desired.

Any suitable phthalocyanine catalyst may be used in the present invention and preferably comprises a metal phthalocyanine. Particularly preferred metal phthalocyanines include cobalt phthalocyanine and vanadium phthalocyanine. Other metal phthalocyanines include iron phthalocyanine, copper phthalocyanine, etc. The metal phthalocyanine, in general, is not readily soluble in aqueous solvents and, therefore, when used in an aqueous alkaline solution or for ease of compositing with a solid carrier, a derivative of the phthalocyanine is preferred. A particularly preferred derivative is the sulfonated derivative. Thus, an especially preferred phthalocyanine catalyst is cobalt phthalocyanine sulfonate. Such a catalyst is available commercially and comprises cobalt phthalocyanine disulfonate and also contains cobalt phthalocyanine monosulfonate. Another preferred catalyst comprises vanadium phthalocyanine sulfonate. These compounds may be obtained from any suitable source or may be prepared in any suitable manner as, for example, by reacting cobalt or vanadium phthalocyanine with 25–50% fuming sulfuric acid. While the sulfonic acid derivatives are preferred, it is understood that other suitable derivatives may be employed. Other derivatives include particularly the carboxylated derivative which may be prepared, for example, by the action of trichloroacetic acid on the metal phthalocyanine or by the action of phosgene and aluminum chloride. In the latter reaction the acid chloride is formed and may be converted to the desired carboxylated derivative by conventional hydrolysis.

In one embodiment the phthalocyanine catalyst is prepared as a solution in an alkaline solvent and particularly an aqueous solution of sodium hydroxide (caustic), potassium hydroxide, etc., although in some cases solutions of ammonium hydroxide, lithium hydroxide, rubidium hydroxide and cesium hydroxide may be employed. In another embodiment, the phthalocyanine catalyst is used in association with a solid carrier. In some cases, the carrier also may exert a catalytic effect and, in other cases, the carrier may serve merely as a means of dispersing the active component and to extend the available surface. Any suitable carrier may be employed. Charcoal is a particularly preferred carrier. Illustrative charcoals include bone char, wood charcoal, charcoal made from coconut or other nut shells, fruit pits, etc. Other carriers include coke, silica, alumina, silica-alumina composites, etc., which may be either synthetically prepared or naturally occurring, the latter usually being activated by acid, heat or other treatment. When the phthalocyanine catalyst is composited with the carrier, this may be prepared in any suitable manner such as by dipping, suspending, immersing, etc. particles of the solid carrier in a solution containing the phthalocyanine catalyst, or the solution may be sprayed, poured or otherwise contacted with the carrier. It is understood that the carrier may be formed into particles of uniform or irregular size and shape including spheres, pills, pellets, rings, saddles, flakes, etc., either after but preferably prior to compositing with the phthalocyanine catalyst.

The invention is further explained with reference to the accompanying flow diagrammatic drawing. Figure I illustrates an embodiment utilizing an oxidation zone and a separate extraction zone. Figure II illustrates an embodiment utilizing a single zone.

Referring to Figure I of the drawing, the alkaline-acid oil charge is introduced into the process through line 1 and is directed into oxidation zone 2, preferably through a suitable spray device illustrated at 3. As hereinbefore set forth, the alkaline solution of acid oils used as charge to the present process contains mercaptans and may be obtained from any suitable source. In zone 2 the charge is intimately contacted with air introduced into zone 2 by way of line 4, preferably through a suitable spray device illustrated at 5.

In zone 2 the charge and air also are contacted with the phthalocyanine catalyst. In one embodiment of the invention the phthalocyanine catalyst is prepared as a solution in a suitable solvent and particularly an alkali metal hydroxide, more particularly an aqueous sodium hydroxide solution, and is introduced into the process through line 6, to be directed through lines 7 and 1 into zone 2. In some cases the catalyst need be introduced only at the beginning of the run because, as will be described later, it is recirculated within the process. In another embodiment fresh catalyst may be introduced intermittently as required. In extreme cases the catalyst may be introduced continuously to the process but it is not expected that this will be necessary for most operations. In another preferred embodiment of the invention, the catalyst is prepared as a composite with a solid carrier, the latter preferably in finely divided condition, and the catalyst thus is circulated within the process as a slurry suspended in the alkali metal hydroxide aqueous solution. In still another embodiment of the invention, the catalyst is composited with a solid carrier and utilized as a fixed bed in zone 2. In this embodiment, line 6 may be used to introduce additional catalyst, if required, to supplant the fixed bed of catalyst in the reaction zone.

Zone 2 also may contain suitable contacting devices such as side to side pans, bubble decks, bubble trays, etc. in order to obtain intimate contacting of the charge, air and catalyst. Any suitable temperature may be used in zone 2 and may range from atmospheric to 400° F. or more, although in general it will not be necessary to utilize temperatures above about 250° F. Although atmospheric pressure may be employed, it generally is preferred to utilize superatmospheric pressure which may range from 5 to 200 p.s.i.g. or more and, in the embodiment illustrated in the drawing, will be sufficient to pressure the effluent products from the bottom of zone 2 into the subsequent extraction zone. The time of contact in zone 2 will, of course, be controlled to effect the desired oxidation of mercaptans to disulfides and may range from a matter of minutes to 24 hours or more, depending on the particular operation employed.

Excess air is removed from the upper portion of zone 2 through line 8 and generally will be vented to the atmosphere, preferably through an incinerator, although it may be supplied to any desired use. The effluent products withdrawn from the bottom of zone 2 will comprise an alkaline solution of acid oils, disulfides, and, in several of the embodiments hereinbefore described, phthalocyanine catalyst. The effluent products are withdrawn from zone 2 through line 9 and, in one embodiment of the invention, are supplied to settler 10. In settler 10, a major proportion of disulfides separate as an upper layer and are withdrawn through line 11. However, the alkaline solution of acid oils still contains dissolved disulfides and therefore are directed by way of line 12 into extraction zone 13, preferably through a suitable spray device illustrated at 14. It generally is desired to recover an acid oil substantially completely free from sulfur compounds and it, therefore, is necessary to further treat the oxidized acid oils in the manner herein described. When desired, settler 10 may be by-passed and the effluent products may be directed by way of lines 9, 15 and 12 to zone 13.

In zone 13, the oxidized acid oils are intimately contacted with a hydrocarbon fraction introduced into zone 13 by way of line 16, preferably through a suitable spray device illustrated at 17. Zone 13 preferably contains suitable contacting devices such as side to side pans, bubble trays, bubble decks, etc. in order to obtain intimate mixing of the acid oils and hydrocarbon fraction. The disulfides are preferentially soluble in the hydrocarbon fraction and thereby will be transferred from the acid oil phase to the hydrocarbon phase. The hydrocarbon fraction containing disulfides is withdrawn through line 18 from the upper portion of zone 13.

In some cases the presence of disulfides in the hydrocarbon fraction used in zone 13 is not harmful and the hydrocarbon fraction may need no further separation. However, in most cases, it is preferable to utilize a fraction in zone 13 which will be either lower boiling or higher boiling than the disulfides contained in the oxidized acid oils. The hydrocarbon fraction containing disulfides then may be subjected to distillation to separate a disulfide fraction and a hydrocarbon fraction free of disulfides. In this embodiment a particularly suitable hydrocarbon fraction comprises a pentane fraction or a pentane-hexane fraction which is lower boiling than the disulfides and may be separated by subsequent fractionation. In another embodiment, a higher boiling hydrocarbon fraction is used and is separated from the disulfides by distilling the disulfides overhead and recovering the hydrocarbon fraction as a bottoms product of the distillation zone. In any event, the recovered hydrocarbon fraction free from disulfides may be reintroduced by way of line 16 into zone 13 for further use in the process.

The alkaline solution of acid oils is withdrawn from zone 13 through line 19. The acid oils will be contained in an alkaline solution which may be the same as originally introduced through line 1 but may be somewhat modified by the alkaline solution, when employed, which is used to introduce the phthalocyanine catalyst through line 6. In any event the alkaline solution of acid oils withdrawn through line 19 is substantially free from mercaptans and then may be treated by conventional methods, such as by reaction with a mineral acid, to spring the acid oils and to separate them from the alkaline compounds.

The phthalocyanine catalyst is substantially insoluble in the hydrocarbon fraction and remains in the aqueous acid oil solution. Accordingly, the specific method of operation will depend upon the particular form in which the catalyst is used in the process. In one preferred embodiment, the catalyst is used as a composite with a finely divided solid carrier and, in this method, a separation of the catalyst occurs in zone 13 and settles to the bottom thereof. The catalyst, as a suspension in the alkaline solution, is withdrawn from the lower portion of zone 13 through line 20, and while all or a portion thereof may be removed from the process by way of line 21, at least a portion thereof is recycled by way of line 22, pump 23, lines 24, 7 and 1 for reuse in zone 2.

In the embodiment in which the catalyst is used as a solution in the alkaline reagent, a portion of the catalyst will be contained in the alkaline-acid oil solution being withdrawn through line 19 and another portion will be contained in the alkaline solution being recycled by way of lines 20, 21, 7 and 1 for reuse in zone 2. In this embodiment, the catalyst is recovered from the product withdrawn from line 19 in any suitable manner. In one method the product is passed over a suitable solid material, including those hereinbefore set forth, and the catalyst is recovered as a composite with the solid material. It is understood that the composite of catalyst and solid carrier may be used for any desired purpose. On the other hand, when the catalyst is used as a fixed bed in zone 2, circulation of the catalyst in the manner described above is not employed.

Figure II of the drawing illustrates the use of a single zone for effecting both the oxidation of mercaptans and extraction of disulfides in a hydrocarbon distillate. This operation is particularly preferred for use as a batch type system. In a batch type operation, the charge of alkaline solution of acid oils is introduced through line 31 into zone 32. A hydrocarbon fraction is introduced through line 33 and forms as a layer, indicated at 34, above the charge which settles as a lower layer, indicated at 35, in zone 32. Phthalocyanine catalyst is introduced into zone 32 in any suitable manner and, in one embodiment of the invention, may be supplied thereto by way of line 36, to be passed by way of line 31 into zone 32, or it may be introduced into zone 32 in any other suitable manner. The catalyst may be used either as a solution in an alkaline reagent, preferably aqueous sodium hydroxide solution, or it may be used as a composite with a finely divided solid carrier and circulate in zone 32 either as a suspension in an alkaline solution or in any other suitable manner.

In operation, the alkaline solution of acid oil and phthalocyanine catalyst are withdrawn from the lower portion of zone 32 through line 37 and are directed by means of pump 38 through lines 39 and 40 into the upper portion of zone 32, preferably through a suitable spray device as illustrated at 41. Air is introduced into zone 32 in any suitable manner. In the case here illustrated, the air is introduced through line 42 and is supplied by way of line 40 into zone 32. The mixture of acid oils, air and catalyst are intimately contacted and reacted in the upper portion of zone 32, which may contain suitable contacting devices if desired, such as side to side pans, bubble trays, bubble decks, etc. The mercaptans contained in the acid oils are oxidized to disulfides, and the reaction products are passed through the layer of hydrocarbon illustrated at 34. The disulfides are dissolved in and retained by the hydrocarbon layer, while the acid oils and catalyst pass downwardly into the lower portion of zone 32. The recirculation is continued until substantially complete oxidation of mercaptans is accomplished. After this time, the recirculation is discontinued and the hydrocarbon fraction containing disulfides is withdrawn through line 43 for further use or treatment in the manner hereinbefore set forth. Similarly, the alkaline solution of acid oils is withdrawn through line 44 for further treatment in the manner heretofore set forth. The catalyst, particularly when composited with solid carrier particles, settles to the bottom of zone 32 and may be removed by way of lines 37, pump 38 and lines 39 and 45. Excess air is removed from zone 32 through line 46. It is understood that zone 32 will be operated under substantially the same conditions as heretofore described for zone 2.

The embodiment in Figure II also may be operated in a semi-continuous or continuous manner. In this embodiment, the product and hydrocarbon-disulfide mixture are each separately withdrawn intermittently or continuously through lines 43 and 44, respectively, while additional hydrocarbon and charge are introduced intermittently or continuously into zone 32 by way of lines 33 and 31, respectively. Additional catalyst may be introduced through line 36 as required.

In the interest of simplicity, valves, heat exchangers, coolers, additional pumps and other appurtenances have been omitted from the drawing. It is understood that these will be provided as required.

The following examples are introduced to illustrate further the novelty and utility of the present invention but not with the intention of unduly limiting the same.

*Example I*

The alkaline solution of acid oils used in this example was a caustic solution containing acid oils recovered from cracked gasoline. The caustic solution of acid oils had a specific gravity of 1.190, an NaOH content of 16.4% by weight, an acid oil content of 36% by weight and a mercaptan sulfur content of 5.7% by weight.

Cobalt phthalocyanine catalyst was added to the above caustic solution of acid oils to provide a concentration of 250 parts per million therein. Catalytic cycle oil also was added in an amount of slightly over 2% by volume of the caustic acid oils solution. The mixture then was subjected to oxidation with air at a temperature of 150° F. for a period of 5 hours, with constant agitation. Following this the mixture was allowed to settle. An upper hydrocarbon layer containing disulfides was removed. The caustic solution of acid oils then was analyzed and found to contain only 1.1% of the original mercaptan sulfur content.

From the above run, it will be seen that almost 99% of the mercaptan sulfur contained in the acid oil solution was removed by treatment in this manner.

*Example II*

This run was made in substantially the same manner as described in Example I except that straight run kerosene was used instead of catalytic cycle oil. After 5 hours of treatment as described in Example I, the original mercaptan sulfur content of the acid oil solution was reduced to 1.5% by weight. Here again it will be noted that the process of the present invention was very effective in reducing the mercaptan sulfur content of the acid oils.

*Example III*

In an operation similar to that shown in Figure II of the drawing, zone 32 is supplied with a caustic solution containing acid oils to a level of about midway in zone 32. Vanadium phthalocyanine sulfonate is composited with finely divided charcoal and is supplied to zone 32 in a concentration of 100 parts per million based on the active NaOH in the catalytic-acid oil solution. A pentane fraction is disposed as a layer above the alkaline solution of acid oils. The alkaline solution of acid oils containing catalyst is recirculated from the lower portion of zone 32 into the upper portion thereof. Air is introduced through line 42, and the mixture reacted in the upper portion of zone 32 and allowed to descend through the pentane layer and fall to the lower portion of the zone. A heat exchanger is installed in line 40, not illustrated in the drawing, in order to heat the recirculated mixture to a temperature of 175° F. The recirculation is continued for a period of 10 hours, after which time recirculation is discontinued. The hydrocarbon-disulfide layer is withdrawn from zone 32. The alkaline acid oil solution is withdrawn separately from zone 32. Additional charge of alkaline acid oils and additional charge of pentane fraction then are supplied to zone 32 and the operation repeated in the manner hereinbefore described.

*Example IV*

This example describes an operation as illustrated in Figure I of the drawing. The alkaline-acid oil solution is a potassium hydroxide solution of acid oil recovered from coke oils. The potassium hydroxide solution of acid oils is heated to 160° F. and passed downwardly through a bed of cobalt phthalocyanine sulfonate catalyst composited with carbon rings. Air is introduced into the lower portion of zone 3 and the excess air removed from the upper portion thereof. The bottoms products are removed through line 9 and allowed to settle in zone 10. A disulfide layer is removed through line 11. The acid oils are separately withdrawn from settler 10 and passed into extraction zone 14. A kerosene fraction is introduced through line 16 into zone 13 and, after preferentially dissolving disulfides therein, is removed from the upper portion of zone 18. The potassium hydroxide solution of acid oils is withdrawn from the lower portion of zone 13 and is now substantially reduced in mercaptan sulfur.

We claim as our invention:

1. A process for removing mercaptans from an alkaline solution of acid oils containing mercaptans, which comprises oxidizing said mercaptans to disulfides in the presence of a phthalocyanine catalyst, and thereafter extracting disulfides from said solution by contacting the same with a solvent consisting essentially of a normally liquid hydrocarbon fraction and preferentially dissolving said disulfides in said hydrocarbon fraction.

2. A process for removing mercaptans from an alkaline solution of acid oils containing mercaptans, which comprises oxidizing said mercaptans to disulfides in the presence of a phthalocyanine catalyst, passing the products into a settling zone, in which an upper disulfide layer separates, separately withdrawing and removing said disulfides, and thereafter extracting additional disulfides from said solution by contacting the same with a solvent consisting essentially of a normally liquid hydrocarbon fraction and preferentially dissolving said disulfides in said hydrocarbon fraction.

3. A process for removing mercaptans from a caustic solution of acid oils containing mercaptans, which comprises reacting said mercaptans with air in the presence of a metal phthalocyanine sulfonate catalyst to form disulfides, and thereafter extracting disulfides from said solution by contacting the same with a solvent consisting essentially of a normally liquid hydrocarbon fraction and preferentially dissolving said disulfides in said hydrocarbon fraction.

4. The process of claim 3 wherein said catalyst is cobalt phthalocyanine sulfonate.

5. The process of claim 3 wherein said catalyst is vanadium phthalocyanine sulfonate.

6. The process of claim 3 wherein said catalyst is iron phthalocyanine sulfonate.

7. A process for removing mercaptans from a caustic solution of acid oils containing mercaptans, which comprises reacting said mercaptans with air in the presence of a metal phthalocyanine sulfonate catalyst to form disulfides, passing the products into a settling zone, in which an upper disulfide layer separates, separately withdrawing and removing said disulfides, and thereafter extracting additional disulfides from said solution by contacting the same with a solvent consisting essentially of a normally liquid hydrocarbon fraction and preferentially dissolving said disulfides in said hydrocarbon fraction.

8. The process of claim 7 wherein said catalyst is cobalt phthalocyanine sulfonate.

9. The process of claim 7 wherein said catalyst is vanadium phthalocyanine sulfonate.

10. The process of claim 7 wherein said catalyst is iron phthalocyanine sulfonate.

References Cited in the file of this patent

UNITED STATES PATENTS

| | | |
|---|---|---|
| 2,306,993 | Lovell et al. | Dec. 29, 1942 |
| 2,413,945 | Bolt | Jan. 7, 1947 |
| 2,663,673 | Kalinowski | Dec. 22, 1953 |
| 2,739,102 | Rylander | Mar. 20, 1956 |
| 2,882,224 | Gleim et al. | Apr. 14, 1959 |

FOREIGN PATENTS

| | | |
|---|---|---|
| 449,783 | Great Britain | July 3, 1936 |